INVENTORS
D.E. PERRY
ROBERT DOYLE
BY
ATTORNEYS

INVENTORS
D.E. PERRY
ROBERT DOYLE
BY
ATTORNEYS

Nov. 2, 1965     D. E. PERRY ETAL     3,215,406
APPARATUS AND METHOD FOR BLENDING PLASTICS
Filed May 18, 1961     5 Sheets-Sheet 5

INVENTORS
D. E. PERRY
ROBERT DOYLE
BY
ATTORNEYS

United States Patent Office

3,215,406
Patented Nov. 2, 1965

3,215,406
APPARATUS AND METHOD FOR BLENDING
PLASTICS
Daniel E. Perry and Robert Doyle, Bartlesville, Okla.,
assignors to Phillips Petroleum Company, a corporation of Delaware
Filed May 18, 1961, Ser. No. 111,109
4 Claims. (Cl. 259—4)

This invention relates to forming molded articles. In one aspect, the invention relates to an improved blender plate having a plurality of openings each of which overlaps each adjacent opening radially and circumferentially. In another aspect, the invention relates to a method for blending molding material by dividing some of the material into several streams which overlap radially and circumferentially and recombining the streams into a central stream. In another aspect, the invention relates to valve means for controlling the flow of molding material, the means comprising a pair of adjacent plates having identical radially and circumferentially overlapping openings having sufficient substantially planar area between the openings to stop flow therethrough when the plates are rotated relative to each other. In another aspect the invention relates to blow molding apparatus comprising such a valve in combination with a molding material accumulation chamber, means for forcing material into the chamber and means for applying pressure to the material in the chamber to force it outwardly through the valve. In another aspect, the invention relates to a method for forming large molded articles by forcing the molding material into an accumulation zone and forcing the material outwardly from the zone through a blending zone wherein the material is divided into a plurality of separate streams and recombined along lines which overlap radially and circumferentially to form a continuous parison.

The process known as blow molding by which hollow objects are produced by extruding a quantity of moldable material into a hollow mold and then inflating the material against the mold surface where it freezes into shape is a very useful one in the plastic molding industry. For the formation of large objects it has been suggested that the plasticized material can be forced into an accumulation chamber by a continuously operating extruder and expelled from the accumulation chamber into the mold by a piston working within the accumulation chamber. In such a molding operation it is desirable to have effective means for closing the outlet of the accumulation chamber during the period that the chamber is filling, to open the outlet promptly at the beginning of the ejection from the chamber, and to blend or work the material on its way from the accumulation chamber to the mold. It is also important to minimize the formation of weld lines during the extrusion of the parison since these tend to be lines of weakness in the molded article.

An object of our invention is to provide efficient control of the outlet of an accumulator for plastic molding material.

Another object of our invention is to provide a process and apparatus for blending plastic material without producing undesirable weld lines.

Another object of our invention is to provide a combination shutoff valve and blender plate useful in processing and controlling the flow of plastic molding material.

Other aspects, objects and the several advantages of this invention are apparent from the specification, the drawing and the appended claims.

According to our invention there is provided a breaker plate comprising a plate having a plurality of openings which overlap adjacent openings both radially and circumferentially. We have found that it is advantageous to make such openings arcuate in shape and to arrange them annularly in the plate. We have also found that improved operation is obtained by forming the openings so that they diverge in a downstream direction and merge along lines which overlap radially and circumferentially.

Also according to our invention there is provided a flow control device comprising a blender plate having a plurality of openings which overlap radially and circumferentially and a plurality of substantially planar areas separating the openings and having every dimension in a circumferential direction greater than the corresponding dimension of the adjacent opening, and a valve plate having similar openings and placed adjacent to the blender plate and rotatable with respect to the plate so that by suitable rotation the openings of one are closed by the planar areas of the other.

Further according to our invention there is provided blow molding apparatus particularly suited for molding large size articles. The improved equipment comprises means for continuously injecting plasticized material into an accumulation chamber, means to pressure the material out of the accumulation chamber into the mold and novel means for blending and controlling the flow of the material between the accumulation chamber and the mold.

Further according to our invention there is provided an improved method for blending a stream of plasticized material by dividing the stream into a plurality of streams which overlap radially and circumferentially and combining the streams to form a single stream substantially without weld lines and a method for molding large plastic articles by continuously forcing the plasticized material into an accumulation zone and periodically forcing the material by pressure from the zone through such a blending operation.

In the drawing FIGURE 1 is a diametric view, of a blow molding machine incorporating our novel flow control device;

Figure 1:
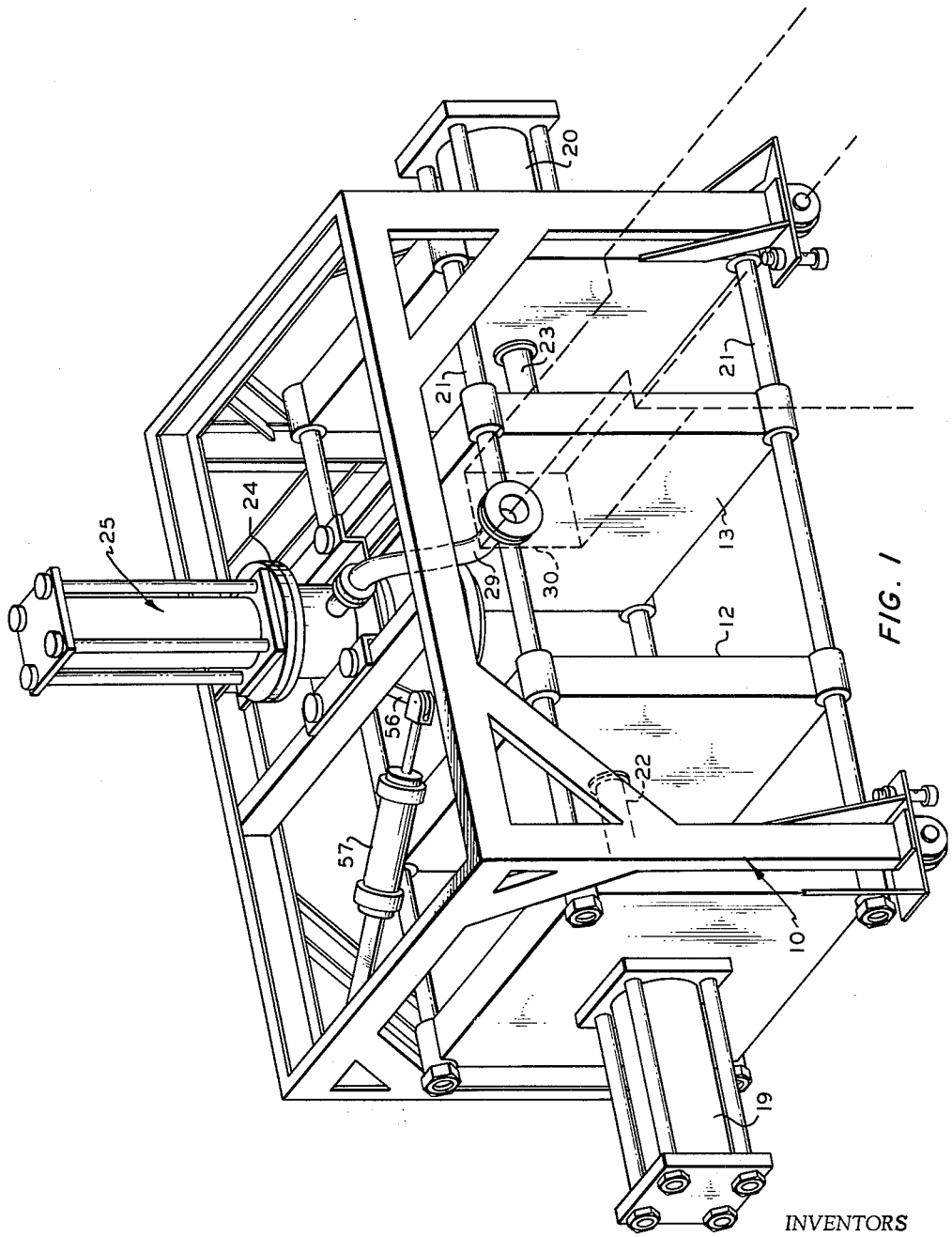
Figure 2:
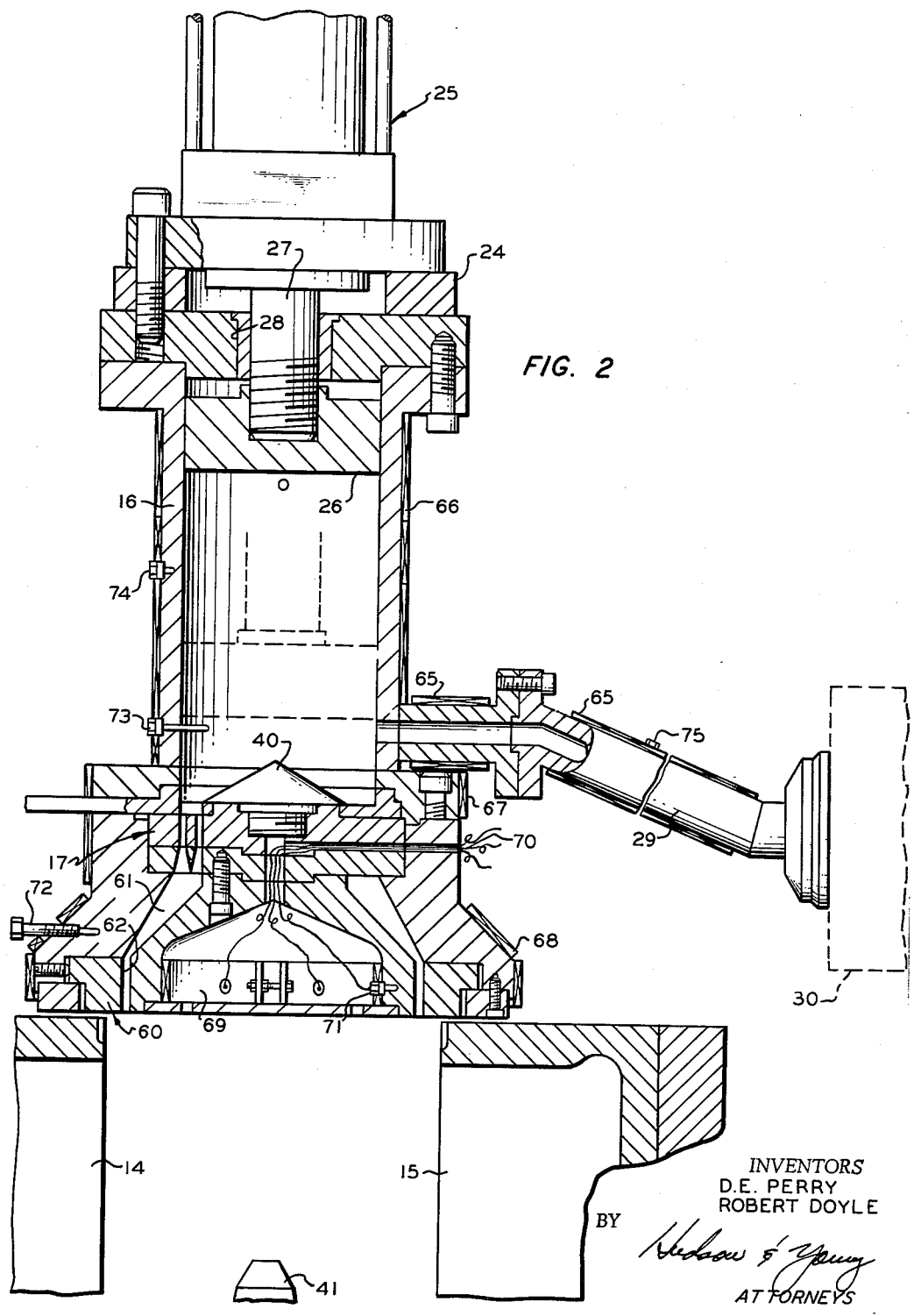
FIGURE 2 is a section view of the machine, and illustrating the actuation of the flow control device.

In the blow molding apparatus of FIGURE 1 and FIGURE 2, a frame 10 supports movable platens 12 and 13 to which are attached two mold halves 14 and 15, and the accumulating chamber 16, the flow control valve 17 and parison die 60.

The platens 12 and 13 and consequently the mold halves 14 and 15 are moved by hydraulic power units 19 and 20, move upon cylindrical guide rods 21 and are connected to the hydraulic power units by piston rods 22 and 23.

The upper end of accumulating chamber 16 is closed by a cover 24 which supports a hydraulic power unit 25 which actuates piston 26 in accumulator 16 by means of piston rod 27 which slides through a sealing gland 28 in cover 24. A hot runner 29 carries the plasticized molding composition from an extruder 30 to accumulating chamber 16.

Figure 3:
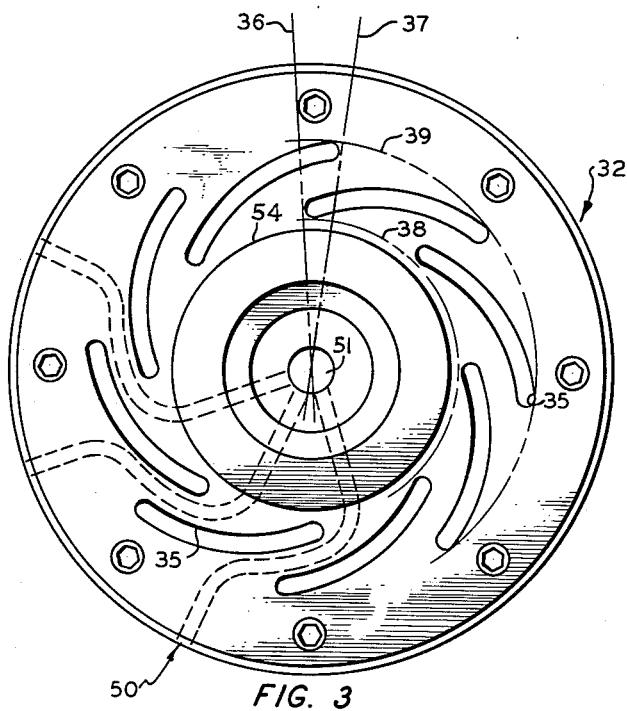
FIGURE 3 is a plan view of the blender plate forming a part of the flow control device of FIGURE 1.
Figure 5:
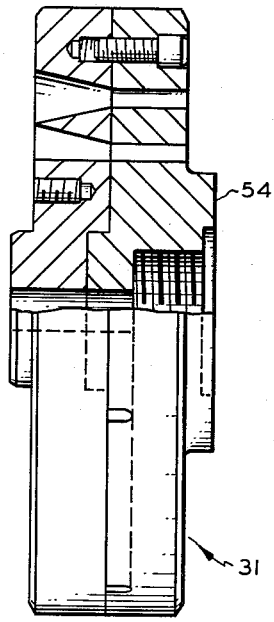
FIGURE 5 is an elevation, partly in cross section, of the blender plate.
Figure 4:
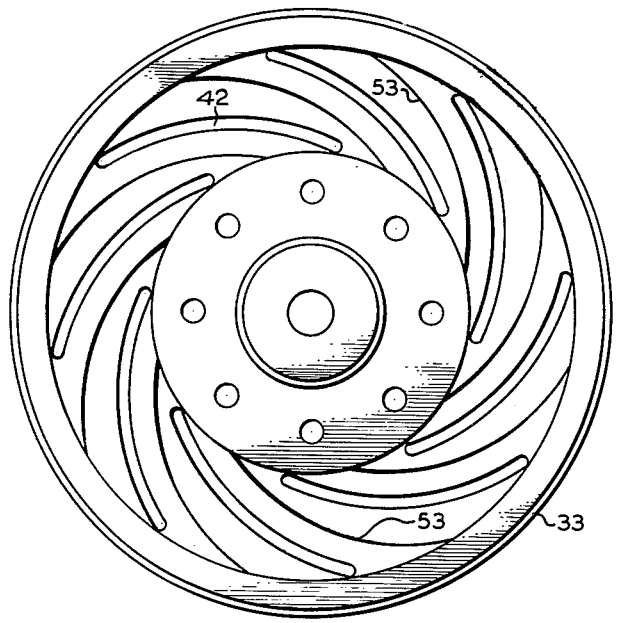
FIGURE 4 is a horizontal view of the lower side of the bottom member of the two member blender plate.
Figure 6:
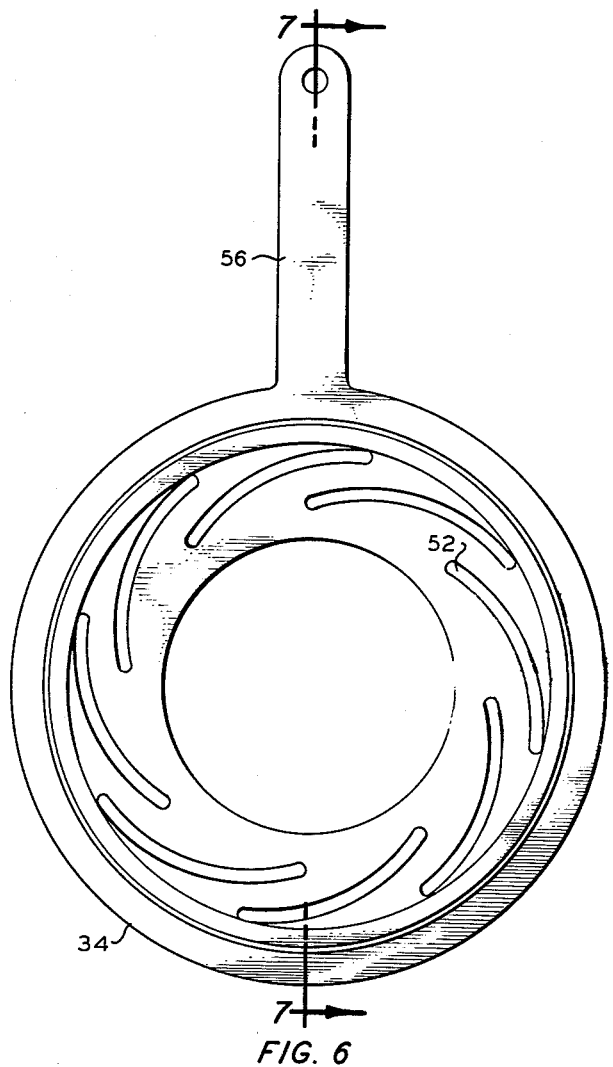
FIGURE 6 is a plan view of the valve plate of the flow control device of FIGURE 1.
Figure 7:
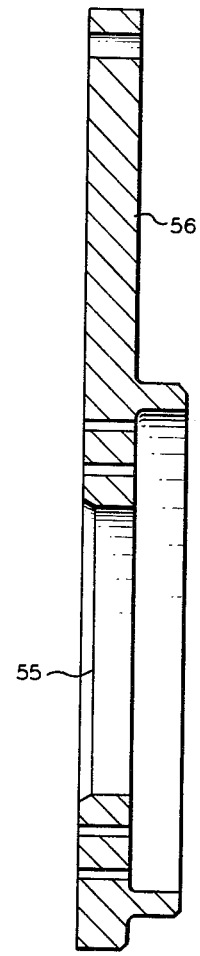
FIGURE 7 is a section along a line 7—7 of FIGURE 6.

Flow control valve 17 comprises a blender plate 31 as illustrated in FIGURE 5 composed of upper portion 32 and lower section 33 illustrated in FIGURE 3 and FIGURE 4, respectively, a valve plate 34 illustrated in FIGURE 6 and FIGURE 7 and a separator cap 40. Upper portion 32 of blender plate 31 is provided with a plurality of openings 35 having parallel sides through this portion. These openings in cross section as shown in FIGURE 3 are formed by swinging arcs from centers which are located on circles concentric with the center point of the blender plate. The radii drawn from the center of blender plate 31 through the ends of adjacent openings, for example, the radii 36 and 37 include substantial portions of the two adjacent openings. These openings therefore are said to overlap radially. Similarly circles drawn using the center of blender plate 31 as a center extending through the inner and outer ends of the openings, circles 38 and 39, include all of the openings therebetween. These openings are, therefore, said to overlap circumferentially over their entire areas. Where two circles can be drawn to include portions of all of the openings but not the entire area of the openings then the openings overlap circumferentially but not throughout their entire areas.

Upper portion 32 also includes a plurality of openings 50 extending from the outer edge thereof to a central opening 51.

Lower portion 33 of blender plate 31 has a plurality of openings 42 which are exact counterparts of openings 35 at the upper surface of lower portion 33 but which diverge toward the lower surface of lower portion 33 to merge in a plurality of lines 53 which overlap radially and circumferentially in the same manner as explained with reference to openings 35.

Valve plate 34 also has a plurality of openings 52 which in horizontal cross section are exact counterparts of the openings 35 in upper portion 32 of blender plate 31. Valve plate 34 is supported for relative rotary motion with respect to blender plate 31 by a machined circular land 54 or portion 32 which fits into a similarly machined depression 55. Valve plate 34 is rotated by applying a force to arm 56.

As illustrated in FIGURE 1 the actuating force for moving valve plate 34 between open and closed positions is applied by a hydraulic power unit 57 attached to frame 10 and to arm 56.

A parison die 60 is provided at the outlet of flow control valve 17 and comprises a diverging, tapering annular space 61 and a cylindrical annular space 62 through which the parison is extruded into the space between the mold halves.

Suitable heaters are provided to maintain the temperatures of the various portions through which the plasticized composition flows high enough to prevent solidification therein. In the machine illustrated in FIGURE 1 and FIGURE 2, electrical heaters 65 are provided around hot runner 29, electrical heaters 66 are provided around accumulator chamber 16, electrical heaters 67 around flow control valve 17, and electrical heater 68 around parison die 60. Internal heater 69 also is provided within a cavity in parison die 60 and is supplied with electrical energy through conductors 70 which extend through openings 50 in blender plate 31. Thermocouples 71, 72, 73, 74 and 75 are provided to control the various heaters.

In operation, plasticized molding composition is fed from extruder 30 through hot runner 29 into accumulating chamber 16 below piston 26. With flow control valve 17 closed, the pressure of the accumulating composition pushes piston 26 from the position indicated by the dotted lines upward into the position, as shown, at the upper end of the chamber 16, hydraulic pressure being removed from power unit 25 at this time. When the desired quantity of molding composition has been accumulated in chamber 16, power unit 57 is actuated to move valve plate 34 to its open position and power unit 25 is actuated to force piston 26 downward thus extruding the accumulated composition through valve 17 and parison die 60 to form a cylindrical parison extending within the space between the two mold halves 14 and 15. When the desired length has been extruded, hydraulic power units 19 and 20 are actuated to move mold halves 14 and 15 together, thus closing the parison at its upper end. Air is then injected into the parison through mandrel 41 extending into the lower portion of the space between the mold halves, as well known in the art, thus forcing the parison outward against the walls of the mold to form the desired molded article.

As the composition is forced out of chamber 16 by piston 26 it is divided by separator cap 40 and flows through the various openings 52 in valve plate 34, the openings 35 in upper portion 32 and the corresponding openings in the lower portion 33 of blender plate 31, thus forming the stream of composition into a plurality of streams which overlap radially and circumferentially and which are blended together, that is merged, along overlapping lines 53 to form an annular stream substantially free of weld lines due to the overlapping at the point of merger.

Preferably the operation of the various hydraulic power units is controlled on a time cycle with automatic timing equipment which can be adjusted to the proper cycle for most efficient operation.

Figure 8:
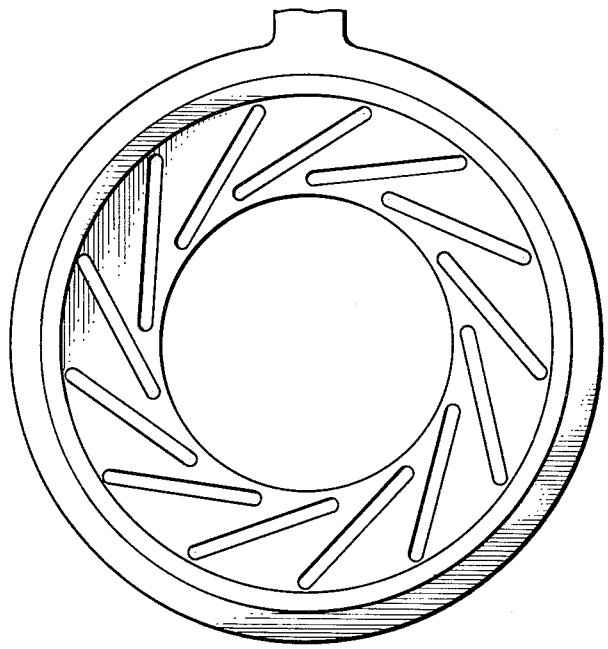
FIGURES 8 and 9 are schematic representations of other examples of an arrangement of openings in a blender plate made according to our invention.
Figure 9:
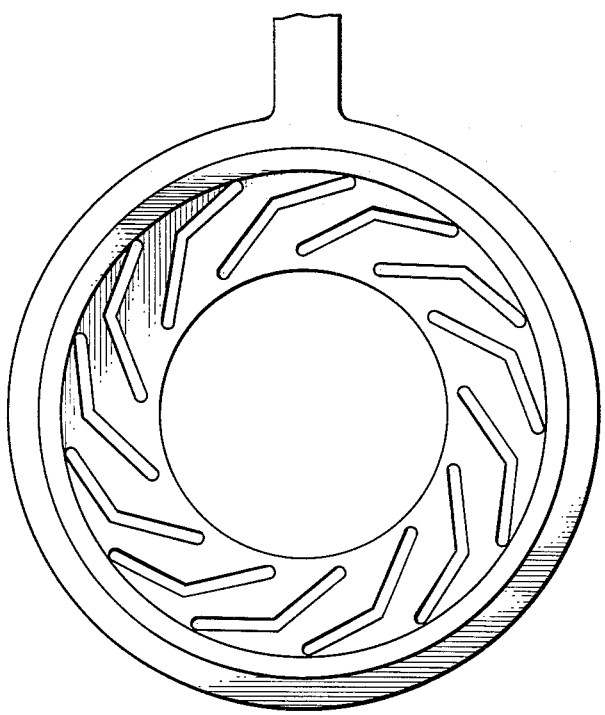

Although the configuration of the openings as illustrated in FIGURES 3, 4, 5, 6 and 7 is a special feature of our invention, we have found that the configurations illustrated in FIGS. 8 and 9 can be used in blending plasticized molding composition streams. FIGURE 8 shows a plurality of straight openings which overlap substantially radially and overlap circumferentially over their entire areas. FIGURE 9 illustrates the use of V-shaped openings which similarly overlap completely circumferentially and a substantial amount radially. Variations of the three general types of individual opening shapes are, of course, possible as for example openings in a stair-step shape, etc.

Many modifications of our invention are immediately obvious. For example, pneumatic or electrical actuation of the various elements can be substituted for the hydraulic actuation illustrated; either a piston type or a screw type extruder can be used; heating means other than electrical heaters as for example heat exchange passageways through which a heat exchange fluid flows can be used; automatic control by elements and conditions within the machine itself rather than on a strict time cycle can be used, the movement of piston 26, movement of the mold elements, the movement of valve 17, etc., and the pressure in accumulation chamber 16 being examples of elements and conditions which can be used to actuate various parts of the cycle.

Although our invention has been described in connection with a combination blender plate and valve, it is applicable also for use without the flow control feature. This is true in those instances wherein the control of the flow of the plasticized material is not a problem. Our blender plate can be applied without the valve for molding tubing as, for example, pipe or blown film wherein a continuous extrusion is formed as well as to blow molding of smaller articles in which case the accumulation chamber is not required. In all of these instances our novel blender plate performs the same function, that of preventing or reducing undesirable weld lines.

Reasonable variation and modification are possible within the scope of our invention which sets forth a novel blending plate and method for blending utilizing radially and circumferentially overlapping openings, a novel flow control unit comprising a novel blender and valve and improved blow molding apparatus employing such a flow control unit.

We claim:
1. A blender plate for use in the extrusion of plastic materials comprising a plate having a plurality of openings, said openings diverging in the direction of flow of said plastic material therethrough and merging along lines which overlap each adjacent line radially, by being at least partially contained within two radii drawn from the center of said plate through the extremities of said adjacent line, and circumferentially, by being at least partially contained within two concentric circles drawn through the extremities of said adjacent line with the center of said plate as a center.

2. A flow control device for use in the extrusion of plastic materials comprising a blender plate through which said plastic material flows having a plurality of openings, each opening overlapping each adjacent opening both radially, by being at least partially contained within two radii drawn from the center of said plate through the extremities of said adjacent opening, and circumferentially, by being at least partially contained within two concentric circles drawn through extremities of said adjacent opening with the center of said plate as the center, one surface of said blender plate having a plurality of substantially planar areas separating said openings, each of said areas having every dimension in a circumferential direction greater than the corresponding dimension of an adjacent opening; a valve plate rotatably associated with said blender plate adjacent thereto, said valve plate having openings matching said openings in said blender plate, said valve plate being rotatable to a position whereby each opening of said valve plate is closed by one of said substantially planar areas.

3. A method for blending a plastic molding material which comprises dividing a main stream of said plastic material into a plurality of individual streams outwardly displaced from the axis of said main stream, each of said individual streams overlapping each adjacent individual stream circumferentially, by being at least partially contained within two concentric circles drawn through the extremities of said adjacent stream with said axis as a center, and radially, by being at least partially contained within two radii drawn from said axis through the extremities of said adjacent stream, and recombining said plurality of individual streams along lines which overlap radially and circumferentially.

4. A flow control device for use in the extrusion of plastic materials comprising a blender plate through which said plastic material flows having a plurality of openings, each opening overlapping both radially and circumferentially with each adjacent opening, said openings diverging in the direction of flow therethrough and merging along lines which overlap radially and circumferentially, the upstream surface of said blender plate having a plurality of substantially planar areas separating said openings, each of said areas having every dimension in a circumferential direction greater than the corresponding dimension of an adjacent opening, a valve plate rotatably associated with said blender plate adjacent said upstream surface of said blender plate, said valve plate having openings matching said openings in said blender plate, said valve plate being rotatable to a position whereby each opening of said valve plate is closed by one of said substantially planar areas.

References Cited by the Examiner
UNITED STATES PATENTS

| 673,045 | 4/01 | Coiffier et al. | 25—17 X |
|---|---|---|---|
| 1,878,924 | 9/32 | Will. | |
| 2,025,419 | 12/35 | Moren | 25—15 X |
| 2,100,366 | 11/37 | Tyler | 137—625.31 |
| 2,443,071 | 6/48 | Honerkamp et al. | 137—625.31 |
| 2,584,827 | 2/52 | Bailey | 259—4 |
| 2,618,143 | 11/52 | McConaughy. | |
| 2,740,986 | 4/56 | Lipscomb et al. | |
| 2,882,025 | 4/59 | Loo | 259—4 |
| 2,887,716 | 5/59 | Crosio. | |
| 2,928,120 | 3/60 | Leghorn et al. | |
| 2,971,219 | 2/61 | Hill. | |
| 2,983,280 | 5/61 | Maison | 137—625.31 X |

FOREIGN PATENTS

| 521,092 | 1/56 | Canada. |
|---|---|---|

WALTER A. SCHEEL, *Primary Examiner.*

M. V. BRINDISI, LEO QUACKENBUSH, *Examiners.*